April 2, 1957  R. LARAQUE  2,787,505

PISTON FOR INTERNAL COMBUSTION ENGINE

Filed July 6, 1954

INVENTOR
ROLAND LARAQUE

BY

Kenway, Jenney, Witter + Hildreth

ATTORNEYS

United States Patent Office 2,787,505
Patented Apr. 2, 1957

2,787,505

PISTON FOR INTERNAL COMBUSTION ENGINE

Roland Laraque, Paris, France

Application July 6, 1954, Serial No. 441,499

Claims priority, application France July 9, 1953

6 Claims. (Cl. 309—14)

The present invention relates to pistons for internal combustion engines and more particularly for engines in which the piston is subjected to very high temperatures.

The piston which forms the subject of the invention is the type of piston in which the gudgeon pin, instead of being fast with the piston, is fast with a small connecting rod and is journalled in two bearing surfaces formed on the piston.

The piston is characterised in that it consists of three parts assembled together; an inner one carrying a gudgeon pin, another in the form of a hollow cylinder forming a sleeve around the first and constituting the skirt of the piston, and, bearing against the head of said cylinder, a third part which constitutes the crown of the piston, channels connecting the various parts being provided on the lateral wall of the first part and on the end of the third part for the circulation under pressure of a cooling liquid such as oil.

Figure 1:
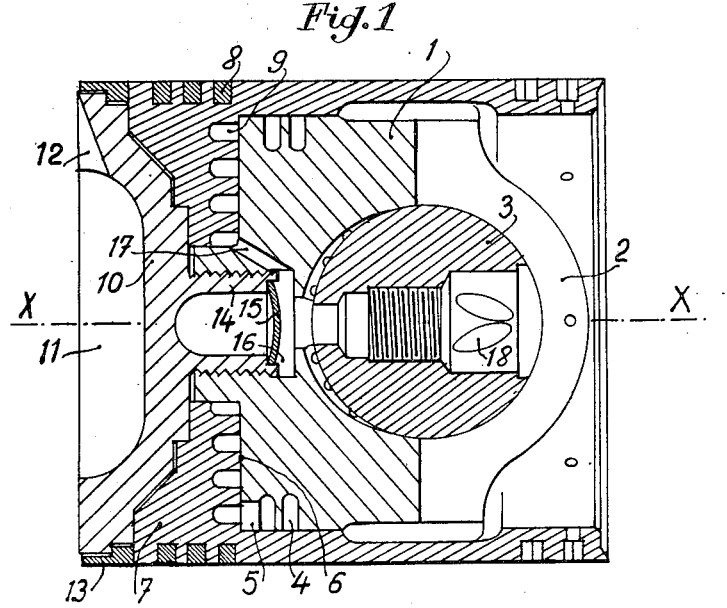
Figure 2:
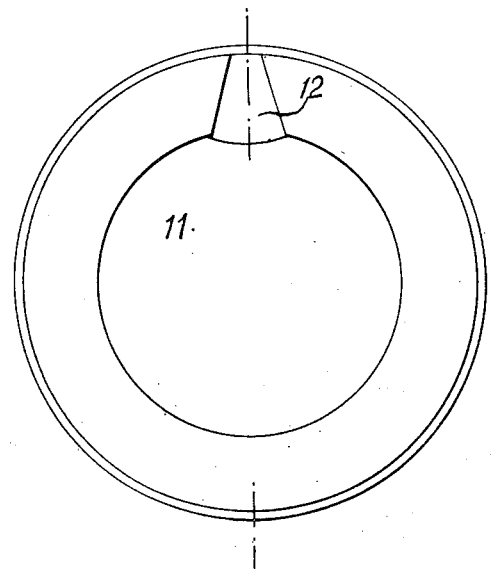

Other features of the invention will be obvious from the following description, which is given by way of example, of a piston for an engine operating on the injection principle. This description is illustrated by means of the accompanying drawings in which Figure 1 is a sectional view on a diametral plane perpendicular to the gudgeon pin, and Figure 2 is a front view looking towards the piston crown.

The piston comprises a central part 1, turned externally in the form of a cylinder and comprising two cheeks 2, in which is journalled a gudgeon pin 3. This central part 1 carries on its cylindrical periphery a helical channel 4 one end of which opens through a passage 5 onto a flat end surface 6 which is disposed perpendicular to the longitudinal axis X—X of the piston.

A skirt 7, whose general shape is that of a cylindrical casing, fits snugly over the part 1. Its external cylindrical surface constitutes the friction surface of the piston in the cylinder. It carries on its periphery piston rings 8 in the usual manner. The skirt 7 has an internal flange formed with a spiral groove 9 one end of which is connected to the end 5 of the helical groove 4 of the part 1.

The part 10 rests on the external surface of the head of the skirt 7, and constitutes the piston crown. Hollowed out of the latter is a cavity 11. In the case of a piston for an injection-type engine, a widened recess or channel 12 of frusto-conical shape is provided, whose small opening or lip is located, at the end of the compression stroke, opposite the nozzle for injection of fuel into the cylinder. This crown also comprises a ring 13.

One feature of the piston consists in the method of assembly for locking together the three fundamental parts 1, 7 and 10.

To this end the central part 1 has a screw threaded cavity intended for receiving a threaded extension 14 of the crown 10, the extension terminating in a thin annular flange. Between the end of the cavity and the end of the threaded extension 14 and enclosed by the thin flange of the extension 14 is interposed a convex plastic capsule 15 the crushing and flattening of which, after the connection between the central part 1 and the crown 10 has been tightened, expands the thin wall flange of the extension 14 and so prevents said parts from becoming unscrewed. The thickness of the plastic capsule or insert 15 is considerably greater than that of the wall of the termination of extension 14. Thus, the flattening of the insert 15 which may be accomplished by a blow from an inserted center punch deforms the thin terminating portion of extension 14 to lock the threads of extension 14 into those of the cavity in which it is screwed.

The piston is cooled in the following manner;

Oil under pressure, admitted into a tube passing axially through the connecting rod (not shown) as well as a gudgeon pin 3, flows into the cavity 16, oiling as it passes the bearing surfaces of the pin 3 and thence, through a channel 17 formed in the central part 1, into the spiral groove 9; then through the passage 5 into the helical groove 4 and by channels which are not shown, connected to the groove 4, through orifices 18 which return it into the connecting rod from which it is returned to the casing of the engine to be recooled and re-pumped.

I claim:

1. A piston for an internal combustion engine comprising a central part formed with journal bearings for a gudgeon pin, a cylindrical skirt surrounding the central part and formed with an internal flange, and a crown engaging said central part whereby said flange is clamped between said central part and said crown, said central part and said skirt being formed with passages for circulation of cooling liquid, comprising a helical groove between contacting surfaces of the central part and the skirt and a spiral groove between the internal flange of the skirt and the contacting surface of the central part, said two grooves being connected to one another to form a channel for said cooling liquid.

2. A piston according to claim 1, having a gudgeon pin fast with a connecting rod formed with a longitudinal channel for said cooling liquid, said gudgeon pin having a transverse channel communicating with said longitudinal channel and with a cavity formed in said central part, said cavity being connected to one end of said helical groove, and one end of said spiral groove communicating, through said central part, with outlet orifices for said cooling liquid formed in the said gudgeon pin.

3. A piston according to claim 1, wherein the clamping together of the three parts is ensured by means of a plastic capsule which is crushed by the screwing of the crown onto the central part.

4. A piston for an internal combustion engine, comprising a central part having bearings for a wrist pin, a cylindrical wall provided with a helical oil groove and a flat end surface, in combination with a skirt part enclosing said central part and having an internal flange presenting a flat end surface provided with a spiral oil groove located adjacent to the end surface of the central part and communicating with the helical groove thereof, the central part having an internal passage whereby oil may be circulated first to the flange of the skirt part and then, by means of said helical groove, to its cylindrical wall, together with a crown part connected to the central part and clamping the internal flange of the skirt part thereto.

5. A piston as defined in claim 1 in which said central part and said crown comprise a screw and nut arranged axially and engaged with one another, an axial opening being formed in one end of the screw, said opening having a diameter approaching the outside diameter of the screw leaving a thin annular wall portion surrounding said opening, a convex disc pressed into said opening and having its concavity facing said crown, said convex disc having been flattened from its original shape to cause outwardly directed pressure to be exerted by said screw on said nut locking said screw to said nut.

6. A piston for an internal combustion engine comprising a cylindrical central portion having two cheeks for journalling a gudgeon pin, a helical lubricating channel being formed about the periphery of said central part, a cylindrical skirt portion closely fitted over said central portion, concentric grooved openings being formed in the periphery of said skirt portion, said skirt portion including an annular portion disposed against one end of said central portion, a spiral lubricating channel being formed in said annular portion and having one end thereof communicating with said helical lubricating channel, a crown portion abutting said annular portion and having a central extension passing through said annular portion and threadably attached to said central portion, and means for locking the threads of said central extension to those of said central portion, an opening being formed axially of said central portion to admit oil to said spiral lubricating channel and thence to said helical lubricating channel.

References Cited in the file of this patent

UNITED STATES PATENTS

| | | |
|---|---|---|
| 1,430,928 | Spencer | Oct. 3, 1922 |
| 1,547,687 | Rohwer | July 28, 1925 |
| 2,064,371 | Burn | Dec. 15, 1936 |
| 2,534,573 | Chatterton | Dec. 19, 1950 |